United States Patent [19]

Billot

[11] Patent Number: 4,658,698
[45] Date of Patent: Apr. 21, 1987

[54] SAFETY DEVICE FOR PREVENTING AN AIRBORNE CHARGE FROM BEING ARMED

[75] Inventor: Jean Billot, Bievres, France

[73] Assignee: Raufaut S.A., Villeneuve la Garenne, France

[21] Appl. No.: 716,842

[22] Filed: Mar. 28, 1985

[30] Foreign Application Priority Data

Apr. 4, 1984 [FR] France .................. 84 05298

[51] Int. Cl.$^4$ .............................................. F41F 5/02
[52] U.S. Cl. ........................................ 89/1.55; 89/1.1
[58] Field of Search .................. 89/1.55, 1.1, 1.58; 244/137 R

[56] References Cited

U.S. PATENT DOCUMENTS

| | | | |
|---|---|---|---|
| 3,378,892 | 4/1968 | Vano | 403/369 |
| 3,595,126 | 7/1971 | Norton | 89/1.55 |
| 3,967,506 | 7/1976 | Billot | 89/1.51 X |
| 4,179,150 | 12/1979 | Conrad et al. | 89/1.55 X |
| 4,322,998 | 4/1982 | Fowler et al. | 89/1.55 |

FOREIGN PATENT DOCUMENTS 188941  4/1937 Switzerland .

Primary Examiner—David H. Brown
Attorney, Agent, or Firm—Fiddler & Levine

[57] ABSTRACT

A safety device for preventing an airborne charge (1) from being armed prior to being dropped, said charge being armed by a draw wire (4) connected to the aircraft applying traction to an arming cable (3) connected to the charge. The safety device comprises a clamping assembly (2) through which the arming cable (2) passes freely while the clamping assembly is open and is clamped thereto when the clamping assembly is closed. The clamping assembly (2) comprises first and second parts (5, 7) which are movable relative to each other in the traction direction (T) of the draw wire (4), with said first part (5) being a "fixed" part which is fixed to the charge by threshold releasable fixing means (6a, 6b) sensitive to traction in said traction direction (T), and said second part (7) being slidably mounted to move relative to the charge in said traction direction (T), and being connected to the draw wire (4).

5 Claims, 3 Drawing Figures

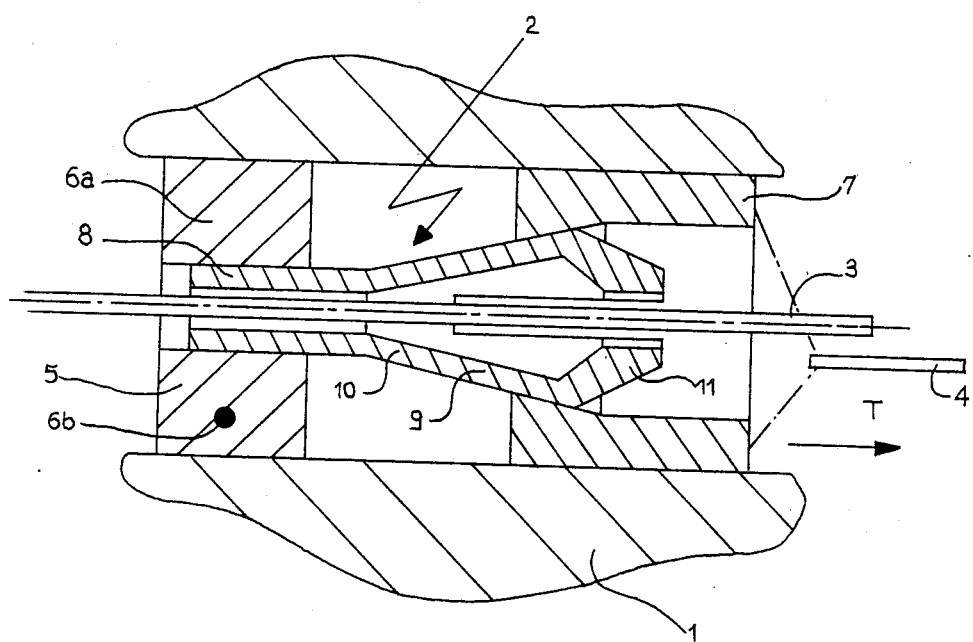
FIG_1

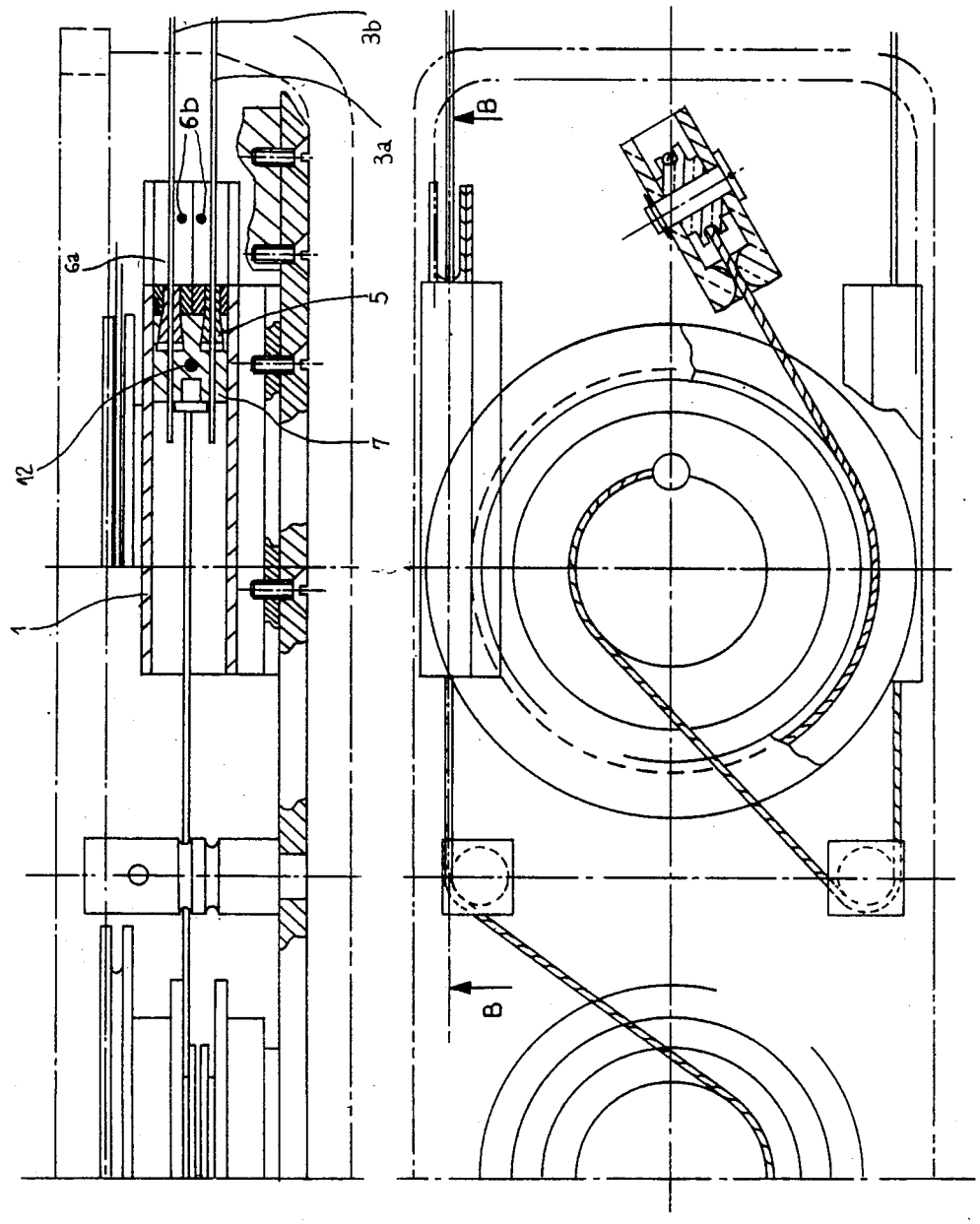
FIG_2B  FIG_2A

SAFETY DEVICE FOR PREVENTING AN AIRBORNE CHARGE FROM BEING ARMED

The present invention relates to a safety device to prevent a droppable airborne charge from being armed prior to being dropped, and also after being dropped if it is a dead drop.

BACKGROUND OF THE INVENTION

Most droppable charges, and in particular bombs, are fitted with various control systems (firing rocket, airmotors, parachute brakes) which need to be triggered with some delay after the charge is dropped, mainly for the safety of the aircraft from which dropping takes places.

Numerous control mechanisms have already been described in the literature, said control mechanisms arming the charge after dropping by pulling a predetermined length of draw wire connected to the carrying aircraft at one end and to the arming cable at the other end. In particular, in French Pat. No. 73 06 671, the Applicant has described a mechanically triggered control mechanism for a droppable device.

Preferred embodiments of the present invention provide a new safety device for preventing a droppable airborne charge from being armed before it is dropped, and also, if required, for enabling the charge to be dead dropped (i.e. dropped without being armed), said safety device being intended to be associated with a mechanism as described above in such a manner as to ensure effective and certain arming of the charge when the charge is dropped together with its control mechanism and with the safety device.

SUMMARY OF THE INVENTION

To this end, the present invention provides such a safety device which comprises a clamping assembly through which the arming cable passes, said cable being free to move through the clamping assembly while the clamping assembly is open and being clamped thereto when the clamping assembly is closed, said clamping assembly comprising first and second parts which are movable relative to each other in the traction direction (T) of the draw wire, and means responsive to said relative displacement to clamp to the arming cable, said first part being a "fixed" part which is fixed to the charge by threshold releasable fixing means sensitive to traction in said traction direction (T), and said second part being slidably mounted to move relative to the charge in said traction direction (T), being free to move relative to said first part over a sufficient distance to close said clamping means, and subsequently being prevented from moving further relative to said first part, whereby traction in said traction direction (T) on said second part firstly causes said second part to move relative to said first part, thereby closing said clamping means on said arming cable, and secondly applies force to said first part, which force, if greater than the threshold of said threshold releasable fixing means, release said fixing means, releasing said first part from said charge and causing traction to be applied to said arming cable.

Preferably, said first or "fixed" part includes a tubular body and at least two jaws extending generally axially from one end of said body, said jaws comprising diverging jaw portions connected to said body and coverging jaw portions connected to said diverging jaw portions, said arming cable passing through said tubular body and between said jaws, said converging jaw portions being suitable for clamping to said arming cable when said jaws are deformed radially inwardly, and said diverging jaw portions co-operating with said second part to be radially inwardly deformed thereby when said second part moves relative to said first part in said traction direction (T).

BRIEF DESCRIPTION OF THE DRAWINGS

An embodiment of the invention is described by way of example with reference to the accompanying drawings, in which:

FIG. 1 is a longitudinal section through a safety device in accordance with the invention;

FIG. 2A is a plan view of a control mechanism together with a safety device in accordance with the invention; and FIG. 2B is a section on a plane B-B of FIG. 2A showing the control mechanism and the safety device.

DESCRIPTION OF PREFERRED EMBODIMENT

In all the figures, the same reference numerals refer to the same items. In FIG. 1, a safety device for preventing an airborne charge 1 from being armed prior to being dropped is essentially constituted by a clamping assembly 2. Arming takes place by means of a draw wire 4 pulling on an arming cable 3 via the clamping assembly 2.

The arming cable passes freely through the clamping assembly 2 while it is open, but is clamped to the clamping assembly 2 when it is closed. The clamping assembly 2 includes two parts which are movable relative to each other in the traction direction T of the draw wire 4 in order to close the clamping assembly.

One of said relatively movable parts is a "fixed" part 5 which is fixed to the charge 1 by threshold releasable fixing means (6a, 6b) sensitive to traction in the said direction T, and the other of said relatively movable parts is a traction part 7 which is slidably mounted in the charge 1 in said direction T and which is fixed to the draw wire.

In one particular embodiment, the "fixed" part 5 comprises a tubular body 8, at least two jaws 9, and the fixing means 6a and 6b.

The tubular body 8 extends axially around the arming cable 3 and is fixed to the charge 1 via the fixing means 6a, 6b.

The jaws 9 extend generally axially from one end of the tubular body 8 and comprise diverging portions 10 connected to the tubular body 8 followed by coverging portions 11. The diverging portions 10 are received in a conical bore in the traction part 7 such that relative displacement of the traction part 7 in the direction T away from the "fixed" part 5 cams the jaws inwardly so that the tips of the converging portions clamp onto the arming cable 3.

The fixing means comprise a sleeve 6a which is fixed to the tubular body 8 and a shear pin 6b which connects the sleeve 6a to the charge 1. The force at which the shear pin 6b shears determines the limit value of traction in the draw wire 4.

The traction part 7 is also in the shape of a sleeve and it is slidably mounted in the charge 1. Although the preferred means enabling the traction part 7 to co-operate with the jaws 9 to clamp them onto the arming cable 3 is a conical bore camming system as mentioned above, other means could be devised to obtain the same clamping effect on relative displacement between the parts 5 and 7 in the direction T.

As can be seen in FIGS. 2A and 2B, the safety device is intended to be associated with a trigger control mechanism for a droppable charge in which the trigger control mechanism is operated by mechanical traction. The trigger control mechanism comprises a draw wire connected to the carrying aircraft and a storage pulley which is designed, once unwound, the activate a control transmission which arms the charge.

In the example shown, two safety devices are provided so that a single draw wire 4 pulls on two arming cables 3a and 3b.

Further, the traction part 7 is held in place in the charge (e.g. a bomb) by a shear pin 12 which is set to shear at a lower force than the force at which the shear pins 6b of the "fixed" part 5 are set to shear.

Naturally, the present invention is not limited to the embodiment described and shown in the drawings, but extends to cover any variants within the scope of the claims.

Specifically, the clamping assembly may be of some quite different structure, and in particular the above-described structure in which the traction part is female and co-operates with a "fixed" part which is male could be inverted such that the traction part is male while the "fixed" part is female.

I claim:

1. A safety device for preventing an airborne charge from being armed prior to being dropped, and also, if so desired, for enabling the charge to be dead dropped, i.e. to be dropped without being armed, said charge being armed by a draw wire connected to the aircraft applying traction to an arming cable connected to the charge, wherein the safety device comprises a clamping assembly through which the arming cable passes, said cable being free to move through the clamping assembly while the clamping assembly is open and being clamped thereto when the clamping assembly is closed, said clamping assembly comprising first and second parts which are movable relative to each other in the traction direction (T) of the draw wire, and means responsive to said relative displacement to clamp to the arming cable, said first part being a "fixed" part which is fixed to the charge by threshold releasable fixing means sensitive to traction in said traction direction (T), and said second part being slidably mounted to move relative to the charge in said traction direction (T), being free to move relative to said first part over a sufficient distance to close said clamping means, and subsequently being prevented from moving further relative to said first part, whereby traction in said traction direction (T) on said second part firstly causes said second part to move relative to said first part, thereby closing said clamping means on said arming cable, and secondly applies force to said first part, which force, if greater than the threshold of said threshold releasable fixing means, releases said fixing means, releasing said first part from said charge and causing traction to be applied to said arming cable.

2. A safety device according to claim 1, wherein said threshold releasable fixing means comprise a shear pin.

3. A safety device according to claim 1, wherein said first or "fixed" part includes a tubular body and at least two jaws extending generally axially from one end of said body, said jaws comprising diverging jaw portions connected to said body and converging jaw portions connected to said diverging jaw portions, said arming cable passing through said tubular body and between said jaws, said converging jaw portions being suitable for clamping to said arming cable when said jaws are deformed radially inwardly, and said diverging jaw portions co-operating with said second part to be radially inwardly deformed thereby when said second part moves relative to said first part in said traction direction (T).

4. A safety device according to claim 3, wherein said second part is a sleeve includes a conical bore disposed around said diverging jaw portions and suitable for camming them radially inwardly when moved relative to said first part in said traction direction (T).

5. A safety device according to claim 4, wherein said conical bore is shaped to co-operate with the outside surfaces of said diverging jaw portions.

* * * * *